United States Patent [19]

Lindsay

[11] Patent Number: 5,621,210

[45] Date of Patent: Apr. 15, 1997

[54] MICROSCOPE FOR FORCE AND TUNNELING MICROSCOPY IN LIQUIDS

[75] Inventor: Stuart M. Lindsay, Tempe, Ariz.

[73] Assignee: Molecular Imaging Corporation, Tempe, Ark.

[21] Appl. No.: 485,497

[22] Filed: Jun. 7, 1995

Related U.S. Application Data

[63] Continuation-in-part of Ser. No. 388,068, Feb. 10, 1995.

[51] Int. Cl.$^6$ .................................................. H01J 37/20
[52] U.S. Cl. ........................... 250/306; 250/307; 73/105
[58] Field of Search ................................. 250/306, 307, 250/440.11, 442.11; 73/105, 788, 817

[56] References Cited

U.S. PATENT DOCUMENTS

| Re. 33,387 | 10/1990 | Binnig | 250/306 |
|---|---|---|---|
| Re. 34,331 | 8/1993 | Elings et al. | 250/306 |
| Re. 34,489 | 12/1993 | Hansma et al. | 250/560 |

(List continued on next page.)

FOREIGN PATENT DOCUMENTS 6-59004  3/1994  Japan.

OTHER PUBLICATIONS

S. Jarvis, et al., "A Novel Force Microscope and Point Contact Probe", Dec., 1993, Rev. Sci. Instrum., vol. 64, No. 12, pp.3515–3520.

A. Stewart, et al., "Use of Magnetic Forces to Control Distance in a Surface Force Apparatus", 1990, Meas. Sci. Technol., vol.1, pp. 1301–1303.

Hansma, et al., "Atomic force microscopy of DNA in aqueous solutions", Nucleic Acids Research, 1993, vol. 21, No. 3, pp. 505–512.

Lindsay, et al., "Scanning tunneling microscopy and atomic force microscopy studies of biomaterials at a liquid–solid interface", J. Vac. Sci. Technol., Jul./Aug. 1993, A., vol. 11, No. 4, pp. 808–815.

Lyubchenko, et al., "Atomic Force Microscopy Imaging of Double–Stranded DNA and RNA", Journal of Biomolecular Structure & Dynamics, 1992, vol. 10, Issue No. 3, pp. 589–606.

Lyubchenko, et al., "Atomic force microscopy of long DNA: Imaging in air and under water", Proc. Natl. Acad. Sci., Mar. 1993, vol. 90, pp. 2137–2140.

Nagahara, et al., "Preparation and characterization of STM tips for electrochemical studies", Rev. Sci. Instrum., Oct. 1989, 60 (10), pp. 3128–3130.

Ohnesorge, et al., "True Atomic Resolution by Atomic Force Microscopy Through Repulsive and Attractive Forces", Science, Jun. 4, 1993, vol. 260, pp. 1451–1456.

Schueir, et al., "Creating and observing surface features with a Scanning Tunneling Microscope" SPIE, 1988, vol. 897, pp. 16–19.

Sonnenfeld, et al., "Atomic–resolution Microscopy in Water", Science, Apr. 11, 1986, vol. 232, pp. 211–213.

D.A. Grigg, et al., "Tip–sample forces in scanning probe microscopy in air and vacuum", Journal Vacuum Science Technology, Jul./Aug. 1992, pp. 680–683.

(List continued on next page.)

*Primary Examiner*—Jack I. Berman
*Assistant Examiner*—Kiet T. Nguyen
*Attorney, Agent, or Firm*—D'Alessandro & Ritchie

[57] ABSTRACT

An instrument for carrying out both scanning tunneling microscopy and atomic force microscopy on the same sample under liquid. A microscope body with a magnetically-suspended sample platen permits both the force-sensing probe and the tunneling tip to be scanned from above the sample, dipping into a liquid cell. The same area of the sample may be scanned by both probes in turn by translating the sample platen that it is under the desired probe. Atomic force microscopy may be carried out on the part of the sample of interest, the sample translated so that the tunneling tip is over the same area and the sample advanced so as to bring the tunneling probe into tunneling range, and a scanning tunneling microscope image obtained.

5 Claims, 3 Drawing Sheets

U.S. PATENT DOCUMENTS

| | | | |
|---|---|---|---|
| 4,343,993 | 8/1982 | Binnig et al. | 250/306 |
| 4,785,177 | 11/1988 | Besocke | 250/442.1 |
| 4,800,274 | 1/1989 | Hansma et al. | 250/306 |
| 4,806,755 | 2/1989 | Duerig et al. | 250/306 |
| 4,866,271 | 9/1989 | Ono et al. | 250/306 |
| 4,868,396 | 9/1989 | Lindsay | 250/306 |
| 4,871,938 | 10/1989 | Elings et al. | 310/328 |
| 4,877,957 | 10/1989 | Okada et al. | 250/306 |
| 4,914,293 | 4/1990 | Hayashi et al. | 250/306 |
| 4,935,634 | 6/1990 | Hansma et al. | 250/560 |
| 4,947,042 | 8/1990 | Nishioka et al. | 250/306 |
| 4,969,978 | 11/1990 | Tomita et al. | 204/153.1 |
| 4,992,728 | 2/1991 | McCord et al. | 324/158 |
| 5,025,658 | 6/1991 | Elings et al. | 73/105 |
| 5,047,633 | 9/1991 | Finlan et al. | 250/306 |
| 5,077,473 | 12/1991 | Elings et al. | 250/306 |
| 5,103,095 | 4/1992 | Elings et al. | 250/306 |
| 5,107,114 | 4/1992 | Nishioka et al. | 250/306 |
| 5,117,110 | 5/1992 | Yasutake | 250/306 |
| 5,120,959 | 6/1992 | Tomita | 250/306 |
| 5,142,145 | 8/1992 | Yasutake | 250/306 |
| 5,144,833 | 9/1992 | Amer et al. | 73/105 |
| 5,155,361 | 10/1992 | Lindsay | 250/307 |
| 5,157,251 | 10/1992 | Albrecht et al. | 250/216 |
| 5,168,159 | 12/1992 | Yagi | 250/306 |
| 5,189,906 | 3/1993 | Elings et al. | 73/105 |
| 5,200,616 | 4/1993 | Kokawa et al. | 250/306 |
| 5,202,004 | 4/1993 | Kwak et al. | 204/153.1 |
| 5,247,186 | 9/1993 | Toda | 250/561 |
| 5,253,516 | 10/1993 | Elings et al. | 73/105 |
| 5,260,567 | 11/1993 | Kuroda et al. | 250/227.19 |
| 5,260,824 | 11/1993 | Okada et al. | 359/368 |
| 5,266,897 | 11/1993 | Watanuki et al. | 324/244 |
| 5,267,471 | 12/1993 | Abraham et al. | 73/105 |
| 5,276,324 | 1/1994 | Ohtaki et al. | 250/306 |
| 5,289,004 | 2/1994 | Okada et al. | 250/306 |
| 5,291,775 | 3/1994 | Gamble et al. | 73/105 |
| 5,294,804 | 3/1994 | Kajimura | 250/561 |
| 5,296,704 | 3/1994 | Mishima et al. | 250/306 |
| 5,298,975 | 3/1994 | Khoury et al. | 356/375 |
| 5,304,924 | 4/1994 | Yamano et al. | 324/158 R |
| 5,307,693 | 5/1994 | Griffith et al. | 73/862.68 |
| 5,314,254 | 5/1994 | Yashar et al. | 384/49 |
| 5,317,153 | 5/1994 | Matsushiro et al. | 250/306 |
| 5,319,960 | 6/1994 | Gamble et al. | 73/105 |
| 5,325,010 | 6/1994 | Besocke et al. | 310/317 |
| 5,338,932 | 8/1994 | Theodore et al. | 250/306 |
| 5,357,105 | 10/1994 | Harp et al. | 250/234 |
| 5,360,977 | 11/1994 | Onuki et al. | 250/306 |
| 5,363,697 | 11/1994 | Nakagawa | 73/105 |
| 5,388,452 | 2/1995 | Harp et al. | 73/105 |
| 5,461,907 | 10/1995 | Tench et al. | 73/105 |
| 5,468,959 | 11/1995 | Tohda et al. | 250/306 |
| 5,500,535 | 3/1996 | Jing | 250/306 |
| 5,513,518 | 5/1996 | Lindsay | 73/105 |
| 5,515,719 | 5/1996 | Lindsay | 73/105 |

OTHER PUBLICATIONS

Hansma et al., "Atomic Force Microscope", Journal of Applied Physics, 76(2) Jul. 15, 1994, pp. 796–799.

Specht, et al., "Simultaneous measurement of tunneling current and force as a function of position through a lipid film on solid substrate", Surface Science Letters, Jul. 22, 1991, pp. L653–L658.

Jung, et al., "Novel Stationary–Sample Atomic Force Microscope with Beam–Tracking Lens", Electronic Letters, vol. 29, No. 3, Feb. 4, 1993, pp. 264–265.

Binnig, et al., "Single–tube three–dimensional scanner for scanning tunneling microscopy", Rev. Sci. Instrum. 57 (8), Aug. 1986, pp. 1688–1689.

Drake et al., "Imaging Crystals, Polymers, and Processes in Water with the Atomic Force Microscope", Science, vol. 243, Mar. 24, 1989, Reports, pp. 1586–1589.

Sonnenfeld, et al., "Atomic–Resolution Microscopy in Water", Reprint Series, Science, vol. 232, Apr. 11, 1986, pp. 211–213.

Davidsson et al., "A new symmetric scanning tunneling microscope design", Journal of Vacuum Science & Technology: Part A, Mar./Apr. 1988, No. 2, pp. 280–282.

Marti et al., "Atomic force microscopy of liquid–covered surfaces: Atomic resolution images", American Institute of Physics, Appl. Phys. Lett. 51(7), Aug. 17, 1987, pp. 484–486.

Kirk et al., "Low–temperature atomic force microscopy", Rev. Sci. Instru., 59 (6), Jun. 1988, pp. 833–835.

Sonnenfeld et al., "Semiconductor topography in aqueous environments: Tunneling microscopy of chemomechanically polished (001) GaAs", Appl. Phy. Lett. 50(24), Jun. 15, 1987. pp. 1742–1744.

Martin, et al., "Atomic force microscope–force mapping and profiling on a sub 100–Åscale", J. Appl. Phys. 61 (10), May 15, 1987, pp. 4723–4729.

Travaglini et al., "Scanning Tunneling Microscopy on Biological Matter", Surface Science 181 (1987), pp. 380–391.

O'Shea et al., "Atomic force microscopy of local compliance at solid–liquid interfaces", Abstract, Cambridge University, pp. 1–13 (Date unknown, unpublished).

Putman et al., "Viscoelasticity of living cells allows high–resolution imaging by tapping mode atomic force microscopy", Department of Applied Physics, University of Twente, received Jan. 4, 1994 (unpublished).

MICROSCOPE FOR FORCE AND TUNNELING MICROSCOPY IN LIQUIDS

CROSS-REFERENCE TO RELATED APPLICATION

This application is a continuation-in-part of co-pending U.S. patent application Ser. No. 08/388,068, filed Feb. 10, 1995 in the name of inventor Stuart M. Lindsay. U.S. patent application Ser. No. 08/388,068 is hereby incorporated herein by reference as if set forth fully herein.

BACKGROUND OF THE INVENTION

1. Field of the Invention

This invention relates to scanning probe microscopes used for imaging at the interface between a fluid and a solid surface and more particularly to a microscope in which probes for both scanning tunneling microscopy (STM) and atomic force microscopy (AFM) are simultaneously scanned over a sample attached to a moveable platen or sample stage suspended or located below the scanner. This arrangement permits the use of separate probes for AFM and STIVI and yet, through relative translation of the sample, permits the same part of the sample to be examined in turn by each probe. In this arrangement, each probe may be optimized for its function (being STM or AFM).

2. The Prior Art

There are many advantages to being able to perform both STM and AFM on the same sample, particularly in the controlled conditions that may be obtained by operating under a fluid with the sample under potential control as taught in U.S. Pat. Nos. 4,868,396 and 5,155,361 to S. Lindsay. The AFM senses Van der Waals forces in the vicinity of a sample surface and thus it provides information about the local topography of a surface, or, if the surface yields under the probe, about its local stiffness. The STM provides information about the electronic properties of a surface. It is essentially a current sensing device for sensing a tunneling current in the vicinity of a sample surface. If these are homogeneous over a surface, as, for example, when the sample is a uniform metal surface, then the STM image may be interpreted in terms of local topography as well. The advantage of combining both measurements in one device is that local electronic features may be separated from local topographic features. For example, a point at which the electronic conductance is high might appear as a "high" point in an STM image. It could not be easily distinguished from a high point on a surface of uniform conductivity. However, if an AFM image is first acquired, so that the topographically high and low points in a given region may be mapped, subsequent STM images can be interpreted in terms of local conductivity. This is particularly important when these microscopes are used in the development and testing of electronic devices or other electrically non-uniform surfaces such as biological and organic molecules as well as cell membranes and the like.

Specht et al. [Surface Science letters 257, L653, 1991] have described a microscope which achieves the goal of carrying out both STM and AFM on the same region of the sample. This prior art is shown in highly schematic form in FIG. 1. The force sensing cantilever 10 is coated with a thin conducting film 12 which covers the force sensing probe 14 at the end of the cantilever 10. The probe 14 is held in contact with the sample surface 16. Deflections of the probe 14 as it is scanned over the sample surface 16 are detected by reflection of a probing laser beam 18 from the back 20 of the cantilever 10. A map of these deflections, recorded as a function of the position of the probe, constitutes the AFM image of the surface topography. The conducting film 12 may be used to record the sample conductivity if a voltage from a voltage source 22 is applied between it and the sample surface 16, and the consequent current flow across node 24 recorded. This prior art device, while fit for its intended use, has the disadvantage that it will not operate in a conducting fluid such as an aqueous electrolyte.

In order to operate an STM under fluids, it is necessary to insulate the probe so that only the very tip is exposed, as described by Sonnenfeld and Hansma [Science, 232, 211, 1986] and Nagahara et al. [Review of Scientific Instruments, 60, 3128, 1989]. This is difficult to do with a force-sensing probe. Furthermore, coating microfabricated cantilevers may impair their sensitivity and linearity as a force probe.

OBJECTS AND ADVANTAGES OF THE INVENTION

Accordingly, it is an object of the present invention to provide a scanning probe microscope that can obtain atomic force and scanning tunneling microscope images from the same region of the same sample contemporaneously in time.

It is another object of the present invention to collect the AFM images with a probe optimized for AFM imaging and to collect the STM images with a probe optimized for STM imaging.

It is yet another object to conduct both the AFM and STM with the sample submerged in liquid and held under potential control with no degradation of the STM image owing to leakage currents into the liquid.

These and many other objects and advantages of the present invention will become apparent to those of ordinary skill in the art from a consideration of the drawings and ensuing description of the invention.

SUMMARY OF THE INVENTION

The foregoing objects have been achieved in the scanning probe microscope of the present invention. The microscope is based on the design described in co-pending U.S. patent application Ser. No. 08/388,068 which is hereby incorporated herein by reference as if set forth fully herein. It comprises a microscope body block having a bore near its center. The bore houses a scanning device to which are attached both the force sensing probe and the tunneling tip. Adjustable supporting mounts pass through the body block and hold a sample platen below the scanning probes. The sample platen is attached to the adjustable mounts by magnetized balls which ride on the smooth upper surface of the sample platen. The sample platen may be translated in the plane defined by the three contact points of the three magnetized balls. Translation is achieved by pushing sideways on the platen. This sideways contact force is removed once the platen is in position so that the platen rests solely on the three points defined by the ends of the magnetized balls. In this way, drift is eliminated and the sample may be moved so that a given area is either under the AFM probe or under the STM tip.

Adjustment of the gap between the probes and the sample surface is achieved in the following manner: During preparation of the microscope for imaging, the STM tip is loaded into its holder after the AFM force-sensing probe has been loaded. Under an optical microscope, the STM tip is adjusted so as to be a small distance further from the sample than the tip of the AFM force-sensing probe. The sample is loaded and a region selected for examination. An AFM image is acquired first with the STM tip being some distance from the sample surface as a consequence of its initial position offset with respect to the AFM probe. The sample is then translated with respect to the probe tips so that the STM tip is over the region of interest. The sample is then advanced into near contact with the STM tip so that an STM image may be obtained. This is achieved without damaging the AFM tip provided that the distance that the force-sensing cantilever is pushed against the sample is small so that the cantilever undergoes only elastic deformation. During this part of the operation, the force-sensing probe is scanned over the sample at a much higher contact force than might be desirable for imaging. However, since it is now displaced from the region of interest, this is inconsequential.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
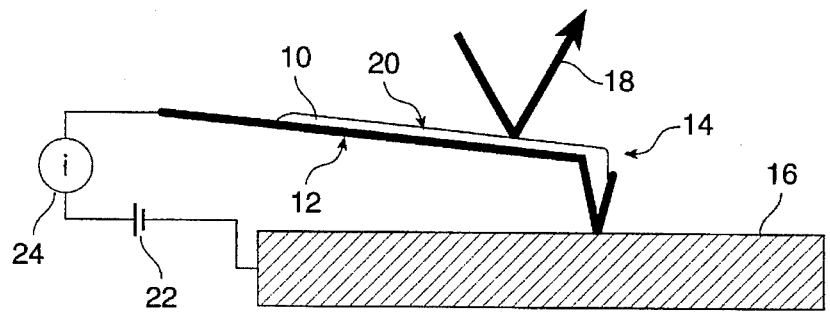
FIG. 1 is a simplified diagram of a prior art device for STM and AFM imaging of the same sample.
Figure 2:
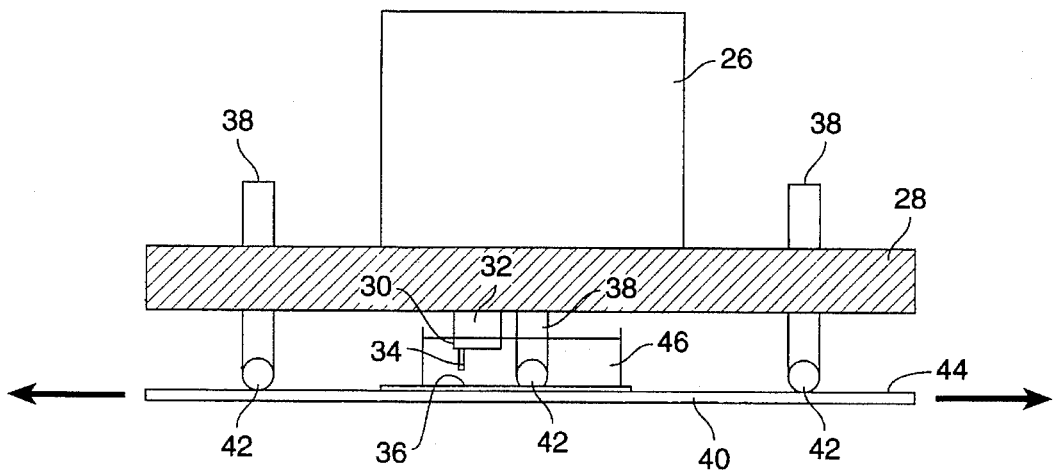
FIG. 2 is a diagram showing a side-view of the combined STM/AFM according to the present invention.

According to the present invention in its presently preferred embodiment, the essential elements of the system are shown in side elevation view in FIG. 2. Referring to FIG. 2, a scanning head 26 is mounted on a body block 28 of an AFM/STM microscope. The end 30 of a conventional x-y piezoelectric scanner 32 protrudes below body block 28 so as to hold scanning probes 34 above the surface of a sample 36. Three adjustable mounts 38 pass through the body block 28 and hold the sample stage or platen 40 by means of magnetized balls 42 (or a similar mechanism) which pull on the top surface 44 of the sample stage 40 which is made of a ferromagnetic material or other material to which magnetized balls 42 will stick due to magnetic attraction. The top surface 44 of the sample stage 40 is preferably polished to a smooth finish so that the sample stage 40 (carrying sample surface 36) may be translated in the "x-y" plane defined by the three contact points between the balls 42 and the sample stage 40. In this way, the sample surface 36 may be moved large distances under the scanning probes 34 simply by pushing upon the sides of the sample stage 40 (as illustrated by the heavy arrows in FIG. 2). The pushing force may be achieved manually, with a micrometer manipulator, with motor-driven machinery, or with an equivalent mechanism, all as well known to those of ordinary skill in the art. The gap between the probes 34 and the sample surface 36 is varied by movement of one of the adjustable mounts 38 which is located relative to the probes 34 and the other mounts so as to give a fine mechanical motion of the gap as shown in my co-pending U.S. patent application Ser. No. 08/388,068. According to one presently preferred embodiment, the sample and probes are submerged in a fluid-holding cell 46 mounted on the sample stage 40.

Figure 3:
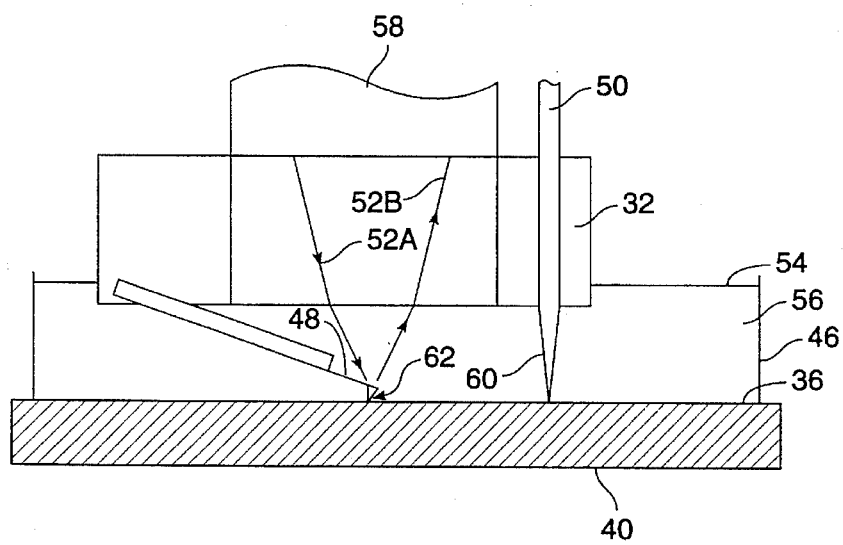
FIG. 3 is a diagram showing a greatly magnified view of the probe holder carrying a force-sensor adjacent to a tunneling tip.

Referring to FIG. 3, the force-sensing cantilever 48 and the tunneling tip 50 are mounted side by side on the end of the x-y scanner 32 above the sample surface 36. In one embodiment an incident laser beam 52A and its reflection off the cantilever 52B are passed through the meniscus 54 at the surface of the fluid 56 by an optic 58 which serves to guide beams 52A, 52B as shown in co-pending U.S. patent application Ser. No. 08/388,068.

Figure 4:
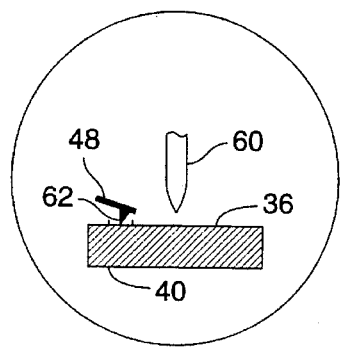
FIG. 4 is a diagram showing a magnified side view of the probe-sample region with the microscope operating as an AFM.
Figure 5:
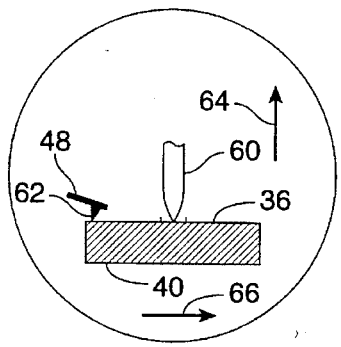
FIG. 5 is a diagram showing a magnified side view of the probe-sample region with the microscope operating as an STM.

According to a presently preferred embodiment of the present invention, as shown in FIG. 3, the STM tip 60 is mounted to the scanner 32 so as to be approximately 10 μm (or enough so that the separation can be viewed with an optical microscope) further from (above) the sample surface 36 than the probe 62 at the end of the force sensing cantilever 48. When the sample surface 36 is moved towards the scanner 32 by means of the adjustable mounts (38 in FIG. 2) contact or near contact is made first with the tip of the force sensing probe 62. This is depicted in FIG. 4. Referring to FIG. 4, the force sensing probe 48 and STM tip 60 are scanned over the surface 36 of the sample on sample stage 40 and an AFM image is collected from the region of interest on the sample surface 36. The sample is then translated with respect to the probe tips 60, 62 so that the same region of interest is now under the STM tip 60 and the sample surface 36 is then moved further toward the STM tip 60 so that an STM image may be collected as shown in FIG. 5 where the heavy arrows 64, 66 indicate the required sample movements. In so doing, the AFM tip 62 is now pressed more forcefully against the sample surface 36, but it is no longer over the region of interest. Since these cantilevers 48 may be bent by many tens of microns without damage, the consequence is that reproducible AFM and STM data can be obtained repeatedly from many regions of a sample without incurring tip or cantilever damage.

Figure 6:
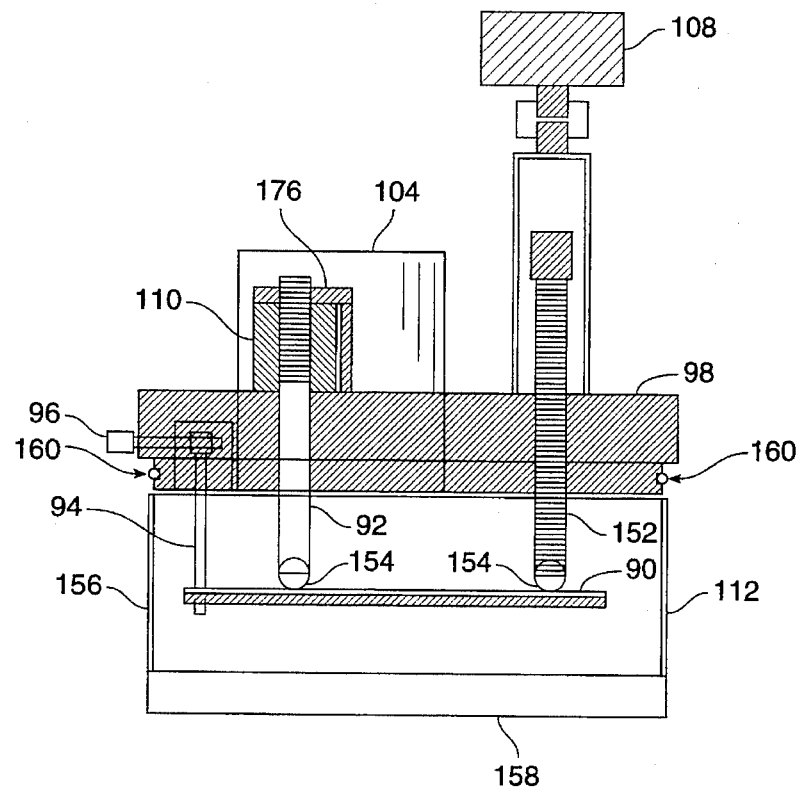
FIG. 6 is a partially cutaway right side view of the body block of the microscope according to the present invention.
Figure 7:
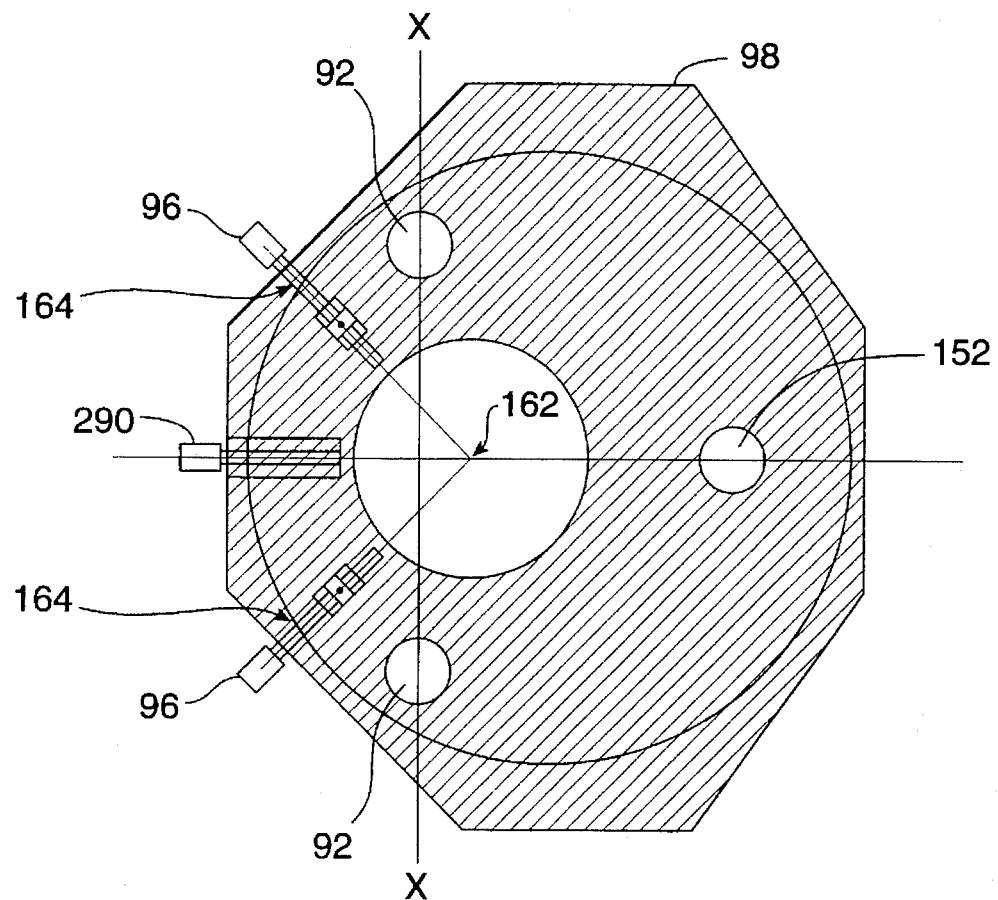
FIG. 7 is a top view of the body block showing the orthogonal travel of the adjustment pegs according to the present invention.
Figure 8:
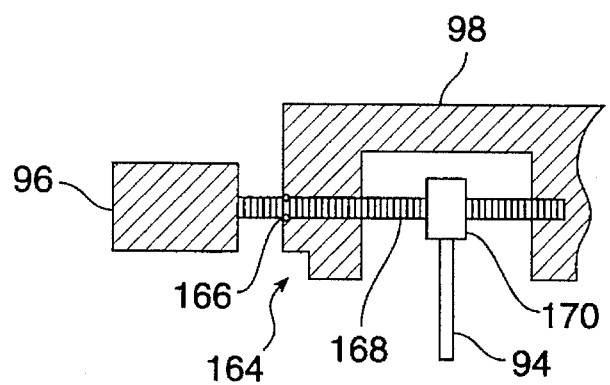
FIG. 8 is an enlarged detail of the body block of the microscope according to the present invention, showing how the peg rides on the micrometer adjustment.

Unlike the prior art which relies on screw adjusters located into kinematic (groove, cone and plane) bearings for vertical alignment, in this invention, the adjustment of the gap is achieved with plungers that eliminate drift inherent in screws. Referring to FIG. 6, plungers 92 are used only to replace the coarse approach screws of the prior art: drift in the fine approach screw 152 attached to motor 108 is not as important because it is positioned so that motion of this approach screw 152 is reduced by the lever reduction factor which is used to obtain fine approach in the first place. Furthermore, since the sample platform 90 is a smooth plane supported by a magnetic means comprising three magnetic balls 154, x-y translation of the sample platform 90 is straightforward and drift-free. Those of ordinary skill in the art will easily recognize that a number of magnetic means would work as well, e.g., steel balls backed to permanent magnets, magnetized steel or iron or nickel balls, ball-shaped permanent magnets, magnets with partially rounded ends for contacting the smooth surface of the sample stage, and the like. A ball shape is not required, only convenient. It is preferred to have the portion of the magnetic means which contacts the upper surface of the sample platform 90 to have some sort of rounded surface to minimize contact area thus reducing sliding friction. An enclosure 112, which in the preferred embodiment, consists of a glass tube 156 sealed at the bottom by a plate 158 is placed over the sample area by being pushed up onto an O-ring seal 160 so as to form a hermetic seal. A top view of the placement of the plungers 92 and fine adjustment screw 152 is shown in FIG. 7. The plungers 92 lie on the line "X—X" which passes close to the point 162 where the tip (not shown in FIG. 7) descends. The fine adjustment screw 152 is set back some distance from this line, so that its vertical motion is reduced at the probe by the ratio of the distance between the probe tip at point 162 and the line "X—X" and the probe tip at point 162 and the fine adjustment screw 152. Also shown is the placement of the micrometer adjustments 96 used for translating the pegs 94. A detail cut away view of the connection between these micrometers 164 and the pegs 94 is shown in FIG. 8. The micrometers 164 are held in place by a clip 166 but are otherwise free to rotate in the body block 98. The clip 166 also serves to form a hermetic seal of the micrometer screw 168 into the body block 98. The peg 94 rides on a threaded block 170. It is located into the sample platform 90 as shown in FIG. 6. In order to isolate the sample platform 90 from drift and creep in these micrometer screws 168, the peg 94 fits into a slot 132 in the sample platform 90 that is somewhat larger that the peg 94. A lamp (not shown) or other electrical indicator circuit as well known in the art may be used to indicate electrical contact (and hence, physical contact) between the peg 94 and the sample platform 90 as these elements form a switch which is "on" when they are in contact and "off" when they are not. The horizontal position of the platform 90 is adjusted with the pegs 94 which are then retracted so that they are out of contact with the sample platform 90 (as indicated by the lamp or other indicating circuit). In this way, drift and creep of the micrometer threads 168 is not communicated to the sample platform 90.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A scanning probe microscope for examining the properties of a sample surface, said microscope comprising:

a body block;

an x-y scanner attached to said body block;

a sample stage;

means for adjustably suspending said sample stage from said body block;

means for translating said sample stage relative to said scanner;

at least one STM probe attached to said scanner;

at least one AFM probe attached to said scanner; and means for scanning a selected area of a sample firstly with one of said STM probe or said AFM probe and secondly with the other of said STM probe or said AFM probe.

2. A scanning probe microscope for examining the properties of a sample surface under a fluid, said microscope comprising:

an x-y scanner;

a sample stage;

a fluid cell containing a fluid disposed on said sample stage;

at least one STM probe attached to said scanner and immersed in said fluid;

at least one AFM probe attached to said scanner and immersed in said fluid;

means for translating said sample stage relative to said scanner; and means for scanning a selected area of a sample disposed on said sample stage and under said fluid first with said AFM probe and then with said STM probe.

3. A scanning probe microscope for examining the properties of a sample surface under a fluid, said microscope comprising:

a body block;

an x-y scanner attached to said body block;

a sample stage;

a fluid cell containing a fluid disposed on said sample stage;

means for adjustably suspending said sample stage from said body block;

means for translating said sample stage relative to said scanner;

at least one STM probe attached to said scanner and immersed in said fluid;

at least one AFM probe attached to said scanner and immersed in said fluid; and means for scanning a selected area of a sample disposed on said sample stage and under said fluid firstly with one of said STM probe or said AFM probe and secondly with the other of said STM probe or said AFM probe.

4. A scanning probe microscope for examining the properties of a sample surface, said microscope comprising:

a sample stage;

at least one STM probe attached to an x-y scanner;

at least one AFM probe attached to said x-y scanner;

at least one of said STM probe and said AFM probe immersed in a fluid contained within a fluid cell disposed on said sample stage;

means for translating said sample stage relative to said STM probe and said AFM probe; and means for scanning a selected area of a sample disposed on said sample stage first with said AFM probe and then with said STM probe.

5. A method of operating an AFM/STM microscope having at least one AFM probe and at least one STM probe, said AFM probe and said STM probe suspended from an x-y scanner over a sample stage capable of translation relative to said AFM probe and said STM probe, a sample surface disposed in a fluid cell containing a fluid, said fluid cell disposed on said sample stage, said method comprising the steps of:

adjusting a first gap between the STM probe and the sample surface so that it is greater than a second gap between the AFM probe and the sample surface;

using the AFM probe to scan a selected area of interest on the sample surface while immersed in the fluid;

translating the sample stage; and using the STM probe to scan said selected area of interest while immersed in the fluid.

* * * * *

UNITED STATES PATENT AND TRADEMARK OFFICE
CERTIFICATE OF CORRECTION

PATENT NO. : 5,621,210
DATED : April 15, 1997
INVENTOR(S) : Stuart M. Lindsay

It is certified that error appears in the above-indentified patent and that said Letters Patent is hereby corrected as shown below:

Title page, item [73], "Assignee:":
Please replace "Tempe, Ark." with --Tempe, Az.--.

Column 1, line 19: replace "STIVI" with --STM--.

Signed and Sealed this

Fifteenth Day of July, 1997

*Attest:*

BRUCE LEHMAN

*Attesting Officer*     *Commissioner of Patents and Trademarks*